March 31, 1931. J. W. OVERTON 1,798,489

PISTON

Filed June 14, 1928

INVENTOR.
James W. Overton
BY
ATTORNEY.

Patented Mar. 31, 1931

1,798,489

UNITED STATES PATENT OFFICE

JAMES W. OVERTON, OF FLINT, MICHIGAN, ASSIGNOR OF ONE-HALF TO SAMUEL D. BELL, OF FLINT, MICHIGAN

PISTON

Application filed June 14, 1928. Serial No. 285,251.

My invention relates to a new and useful improvement in a piston adapted for reciprocal movement in a cylinder and relates particularly to that type of pistons used in internal combustion engines.

It is another object of the invention to provide a piston in which a free, easy and maximum expansion of the skirt or guide portion may take place without being restricted by the connections and the head which are attached to the skirt.

Another object of the invention is the provision of a skirt or guide portion of the piston corrugated to permit free and easy expansion and contraction.

Another object of the invention is the provision of a method of attaching the piston to the connecting rod which will permit free and easy expansion of the skirt or guide portion and afford a rigid and durable means of connection.

Other objects will appear hereinafter.

The invention consists in the combination and arrangement of parts hereinafter described and claimed.

The invention will be best understood by a reference to the accompanying drawings which form a part of this specification and in which Fig. 1 is a side elevational view of the invention.

Figure 1:
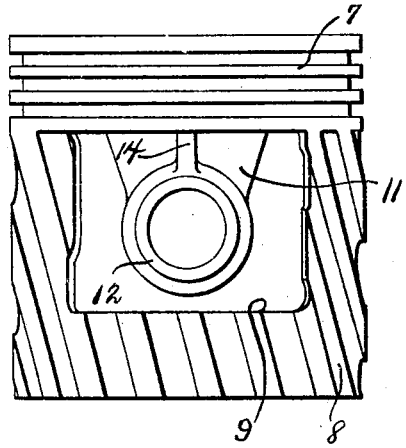
Figure 2:
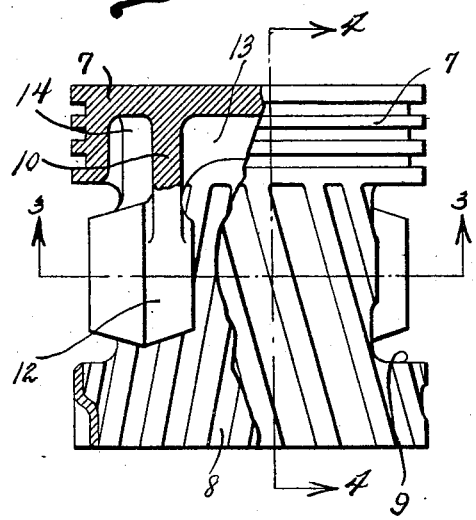
Fig. 2 is a side elevational view of the invention with a part broken away and a part shown in section.
Figure 3:
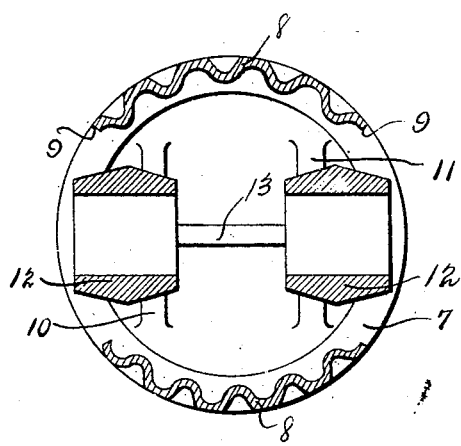
Fig. 3 is a sectional view taken on line 3—3 of Fig. 2.
Figure 4:
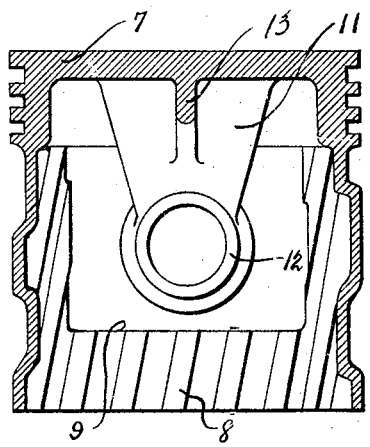
Fig. 4 is a sectional view taken on line 4—4 of Fig. 2.

The piston comprises the grooved ring bearing portion 7 which constitutes the head, and the skirt or guide portion 8, this skirt or guide portion being corrugated at an inclination to the axis to permit free and easy expansion and contraction of the skirt. The skirt is cut away as at 9 to provide openings and reduce the weight thereof. Projecting inwardly from the inner surface of the head 7 are brackets 10 and 11. Each of these brackets and the connecting parts is similarly constructed so that a description of one will suffice for both.

Carried on the end of the bracket is a bearing forming boss 12 adapted for providing a bearing for the wrist pin. Projecting inwardly from the inner surface of the head 7 and extending between the brackets 10 and 11 is a reinforcing rib 13. The outer face of each of the brackets 10 is also provided with a reinforcing rib 14.

The wrist pin extending through the bearing forming bosses 12 connects the piston to the connecting rod free of the skirt, so that the only connection is between the wrist pin and the head itself, thus leaving the skirt free to expand and contract independently of the head. This expansion and contraction is further facilitated by the corrugations and by making the connections in this manner a maximum efficiency of piston operation is effected.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A piston of the class described, comprising: a head; a skirt carried by said head, said skirt being corrugated to provide grooves on the periphery and on the inner surface of said skirt.

2. A piston of the class described, comprising: a head; a skirt carried by said head, said skirt being corrugated to provide grooves on the periphery and on the inner surface of said skirt, the corrugations of said skirt extending at an inclination to the axis of said piston.

In testimony whereof I have signed the foregoing specification.

JAMES W. OVERTON.